(12) United States Patent
Wheeler et al.

(10) Patent No.: US 11,180,098 B2
(45) Date of Patent: *Nov. 23, 2021

(54) MONITORING OF VEHICLE WINDOW VIBRATIONS FOR VOICE-COMMAND RECOGNITION

(71) Applicant: Ford Global Technologies, LLC, Dearborn, MI (US)

(72) Inventors: Joshua Wheeler, Trenton, MI (US); Scott Andrew Amman, Milford, MI (US); Leah Busch, Berkley, MI (US); Ranjani Rangarajan, Farmington Hills, MI (US); John Edward Huber, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/598,079

(22) Filed: Oct. 10, 2019

(65) Prior Publication Data

US 2020/0039456 A1  Feb. 6, 2020

Related U.S. Application Data

(63) Continuation of application No. 15/727,148, filed on Oct. 6, 2017, now Pat. No. 10,479,300.

(51) Int. Cl.
| | | |
|---|---|---|
| *H04R 1/02* | (2006.01) | |
| *H04R 1/08* | (2006.01) | |
| *B60R 16/037* | (2006.01) | |
| *G01H 11/00* | (2006.01) | |
| *H04R 1/46* | (2006.01) | |
| *G01H 11/08* | (2006.01) | |
| *H04R 17/02* | (2006.01) | |
| *H04R 19/04* | (2006.01) | |
| *H04R 23/02* | (2006.01) | |

(52) U.S. Cl.
CPC ......... *B60R 16/0373* (2013.01); *G01H 11/00* (2013.01); *G01H 11/08* (2013.01); *H04R 1/46* (2013.01); *H04R 17/02* (2013.01); *H04R 19/04* (2013.01); *H04R 23/02* (2013.01); *H04R 2499/13* (2013.01)

(58) Field of Classification Search
CPC . H04R 1/02; H04R 1/105; H04R 1/08; H04R 1/025; H04R 1/026
USPC ................................. 381/332–336, 365, 388
See application file for complete search history.

(56) References Cited

U.S. PATENT DOCUMENTS 5,748,075 A * 5/1998 Dirmeyer ............... B60R 16/037
  180/274
6,057,660 A * 5/2000 Meier .................... B60S 1/0818
  15/250.12

(Continued)

*Primary Examiner* — Suhan Ni
(74) *Attorney, Agent, or Firm* — Frank Lollo; Eversheds Sutherland (US) LLP (57) ABSTRACT

Method and apparatus are disclosed for monitoring of vehicle window vibrations for voice-command recognition. An example vehicle includes a window, an outer layer, a vibration sensor coupled to the window to detect audio vibrations, an audio actuator coupled to the outer layer to vibrate the outer layer, and a controller. The controller is to detect a voice command from a user via the vibration sensor, identify an audio response based upon the voice command, and emit the audio response to the user via the audio actuator.

13 Claims, 3 Drawing Sheets

(56) References Cited

U.S. PATENT DOCUMENTS

| | | | |
|---|---|---|---|
| 2009/0187300 A1* | 7/2009 | Everitt | G01C 21/3602 701/31.4 |
| 2014/0306799 A1* | 10/2014 | Ricci | H04W 4/21 340/5.83 |
| 2014/0309806 A1* | 10/2014 | Ricci | G06F 21/32 701/1 |
| 2017/0088072 A1* | 3/2017 | Curtis | G08B 31/00 |

* cited by examiner

MONITORING OF VEHICLE WINDOW VIBRATIONS FOR VOICE-COMMAND RECOGNITION

CROSS-REFERENCE TO RELATED APPLICATIONS

The present disclosure claims priority to, the benefit of, and is a continuation of U.S. patent application Ser. No. 15/727,148, filed Oct. 6, 2017, which is hereby incorporated by reference herein in its entirety.

TECHNICAL FIELD

The present disclosure generally relates to voice-command recognition and, more specifically, monitoring of vehicle window vibrations for voice-command recognition.

BACKGROUND

Typically, vehicles include a plurality of features and/or functions that are controlled by an operator (e.g., a driver). Oftentimes, a vehicle includes a plurality of input devices to enable the operator to control the vehicle features and/or functions. For instance, a vehicle may include button(s), control knob(s), instrument panel(s), touchscreen(s), and/or touchpad(s) that enable the operator to control the vehicle features and/or functions. Further, in some instances, a vehicle includes a communication platform that communicatively couples to mobile device(s) located within the vehicle to enable the operator and/or another occupant to interact with the vehicle features and/or functions via the mobile device(s).

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for monitoring of vehicle window vibrations for voice-command recognition. An example disclosed vehicle includes a window, an outer layer, a vibration sensor coupled to the window to detect audio vibrations, an audio actuator coupled to the outer layer to vibrate the outer layer, and a controller. The controller is to detect a voice command from a user via the vibration sensor, identify an audio response based upon the voice command, and emit the audio response to the user via the audio actuator.

An example disclosed method includes detecting, via a vibration sensor, a voice command of a user. The vibration sensor is coupled to a window of a vehicle to detect audio vibrations. The example disclosed method also includes identifying, via a processor, an audio response based upon the voice command and emitting, via an audio actuator, the audio response to the user. The audio actuator is coupled to an outer layer of the vehicle to vibrate the outer layer.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Typically, vehicles include a plurality of features and/or functions that are controlled by an operator (e.g., a driver). Oftentimes, a vehicle includes a plurality of input devices to enable the operator to control the vehicle features and/or functions. For instance, a vehicle may include button(s), control knob(s), instrument panel(s), touchscreen(s), and/or touchpad(s) that enable the operator to control the vehicle features and/or functions. Further, in some instances, a vehicle includes a communication platform that communicatively couples to mobile device(s) located within the vehicle to enable the operator and/or another occupant to interact with the vehicle features and/or functions via the mobile device(s).

Recently, some vehicles include microphone(s) that enable an operator located within a cabin of the vehicle to audibly interact with vehicle features and/or functions (e.g., via a digital personal assistant). However, such microphones are located within the vehicle cabin and potentially are unable to detect audio commands from the operator of the vehicle when the operator is located outside of the cabin of the vehicle. Further, such microphones may be unable to be located outside of the cabin of the vehicle due to potentially being damaged by inclement weather conditions and/or contact with other objects.

Example methods and apparatus disclosed herein include a vehicle system that enables voice activation of vehicle features by a user located outside a cabin of a vehicle. The vehicle system includes communication node(s) that detect when a key fob of the user that is associated with the vehicle is near the vehicle. The vehicle system includes accelerometer(s) positioned on window(s) of the vehicle that enable the window(s) to function as microphone(s). The accelerometer(s) are activated to receive signal(s) when the communication node(s) detect that the key fob is nearby. The accelerometer(s) sends the received signal(s) to a controller for speech recognition analysis. The controller is configured to identify a wake-up indicator (e.g., "Hey SYNC") and a subsequent command within the signal(s). The vehicle system causes the vehicle to provide information (e.g., a factory-recommended tire pressure, a factory-recommended fuel-type (e.g., premium fuel), a factory-recommended engine oil, identification of a fuse box location) and/or perform vehicle function(s) (e.g., starts a vehicle, send a text message, etc.) based upon the identified command(s). For example, the vehicle system includes actuator(s) (e.g., of SoundBug device(s)) located on window(s) and/or other outer layer(s) of the vehicle. The actuator(s) vibrate the window(s) and/or other outer layer(s) to cause those surface(s) to function as speaker(s) that provide the requested information to the user that is located outside of the vehicle.

Figure 1:
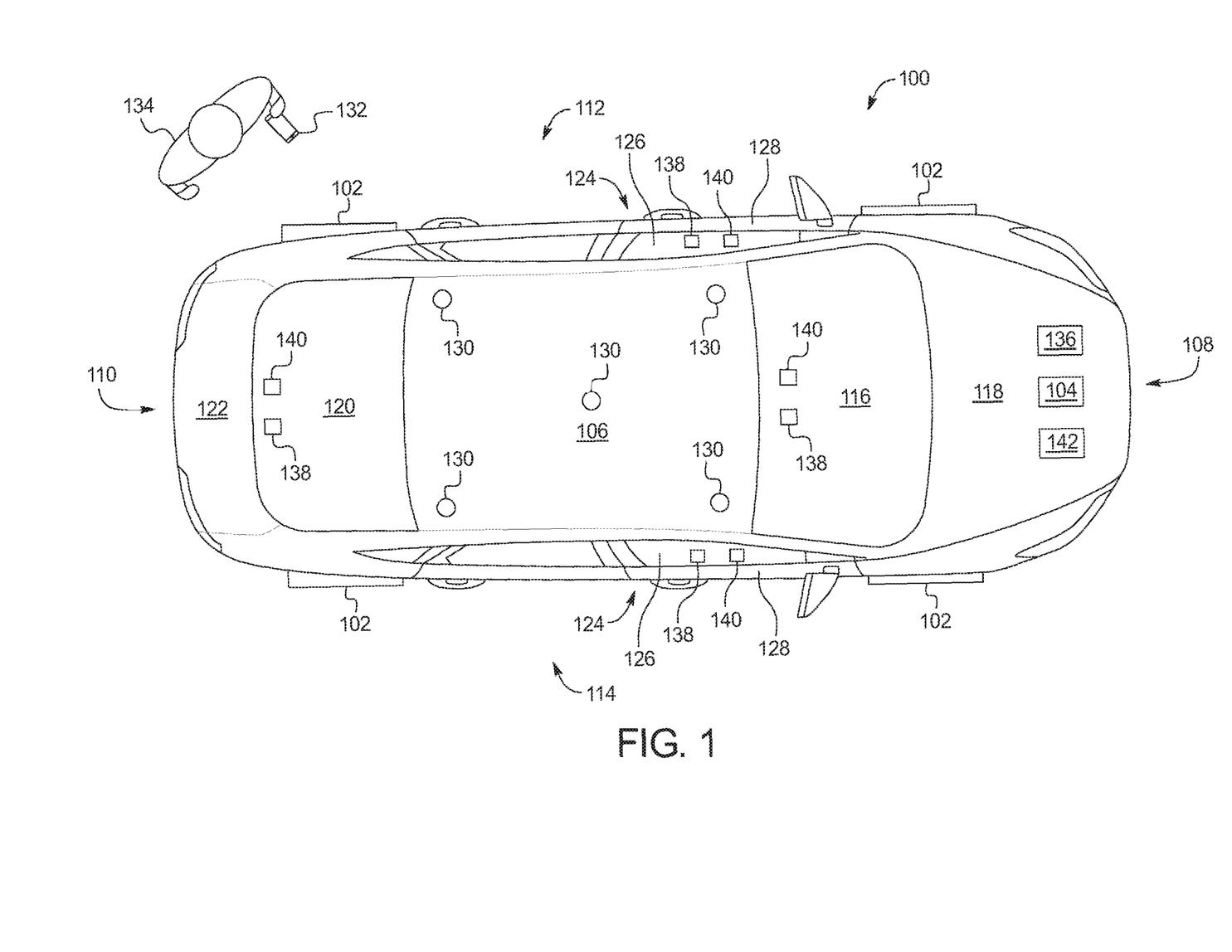
FIG. 1 illustrates an example vehicle in accordance with the teachings herein.

Turning to the figures, FIG. 1 illustrates an example vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input).

In the illustrated example, the vehicle 100 includes tires 102 and an engine 104. For example, each of the tires 102 is coupled to a body of the vehicle 100 at a different respective wheel well of the vehicle 100 to enable the vehicle 100 to travel along a road surface. The engine 104 of the illustrated example is an internal combustion engine, an electric motor, and/or any other power source that propels movement of the vehicle 100. In some examples, the engine 104 is initially activated upon receiving energy from a starter battery and subsequently is powered via energy receiving from an alternator.

The vehicle 100 of the illustrated example also includes a cabin 106, a front side 108, a rear side 110, a driver side 112, and a passenger side 114. The front side 108 includes a front windshield 116 and a front panel 118 (also referred to as a hood), and the rear side 110 includes a rear windshield 120 and a rear panel 122 (also referred to as a tailgate panel and/or a trunk panel). The vehicle 100 includes doors 124 that include side windows 126 and door panels 128. For example, the driver side 112 of the vehicle 100 includes one of the doors 124 (e.g., a driver-side door) that includes one of the side windows 126 and one of the door panels 128. Further, the passenger side 114 includes one of the doors 124 (e.g., a passenger-side door) that includes another of the side windows 126 and another of the door panels 128. As illustrated in FIG. 1, the front windshield 116, the front panel 118, the rear windshield 120, the rear panel 122, the side windows 126, and the door panels 128 form, at least in part, an outer layer of the vehicle 100. That is, the outer layer of the vehicle 100 includes the front windshield 116, the front panel 118, the rear windshield 120, the rear panel 122, the side windows 126, and the door panels 128. Additionally, the cabin 106 is defined, at least in part, by the front windshield 116, the rear windshield 120, and the doors 124. In some examples, the front windshield 116 is formed of laminated or safety glass, and the rear windshield 120 and the side windows 126 are formed of non-laminated, tempered glass. Further, the front panel 118, the rear panel 122, and the door panels 128 are formed of, for example, steel, aluminum, other metallic material, plastic, carbon fiber, fiberglass, other composite material, and/or any combination thereof.

As illustrated in FIG. 1, the vehicle 100 includes one or more communication nodes 130. In the illustrated example, the communication nodes 130 are configured to communicatively connect to a key fob 132 of a user 134 of the vehicle 100. As used herein, a "key fob" refers to an electronic device that wirelessly communicates with the vehicle 100 (e.g., via one or more of the communication nodes 130) to unlock and/or lock one or more of the doors 124, open and/or close one or more of the doors 124, and/or activate the engine 104 of the vehicle 100. In the illustrated example, the user 134 is carrying the key fob 132 for wireless communication with the communication nodes 130. In other examples, the user 134 carries a mobile device functioning as a phone-as-a-key for wireless communication with the communication nodes 130. As used herein, a "phone-as-a-key" refers to a mobile device (e.g., a smart phone, a wearable, a smart watch, a tablet, etc.) that includes hardware and/or software to function as a key fob.

The communication nodes 130 include hardware and firmware to establish a wireless connection with the key fob 132. For example, the communication nodes 130 are short-range wireless modules that wirelessly communicate with key fob(s) and/or phone-as-the-key(s) of user(s) (e.g., the key fob 132 of the user 134) of the vehicle 100 via short-range wireless communication protocols. In some examples, the communication nodes 130 implement the Bluetooth® and/or Bluetooth® Low Energy (BLE) protocols. The Bluetooth® and BLE protocols are set forth in Volume 6 of the Bluetooth® Specification 4.0 (and subsequent revisions) maintained by the Bluetooth® Special Interest Group. In other examples, the communication nodes 130 may use WiFi, WiMax, NFC, UWB (Ultra-Wide Band), and/or any other communication protocol that enables the communication nodes 130 to communicatively couple to the key fob 132.

Prior to communicating with the key fob 132, one or more of the communication nodes 130 may be utilized to authenticate the key fob 132 for communication with the communication nodes 130. Upon being authenticated, the key fob 132 is paired with the vehicle 100. For example, to authenticate the key fob 132, one or more of the communication nodes 130 intermittently broadcast a beacon (e.g., a low-energy beacon such as Bluetooth® low-energy (BLE) beacon). When the key fob 132 is within a broadcast range of the one or more of the communication nodes 130, the key fob 132 receives the beacon and subsequently sends a key. One or more of the communication nodes 130 authenticate the key fob 132 for communication with the communication nodes 130 upon receiving the key from the key fob 132. In other examples, the key fob 132 broadcasts a beacon and one or more of the communication nodes 130 subsequently receive the beacon to authenticate communication between the key fob 132 and the communication nodes 130.

Figure 2:
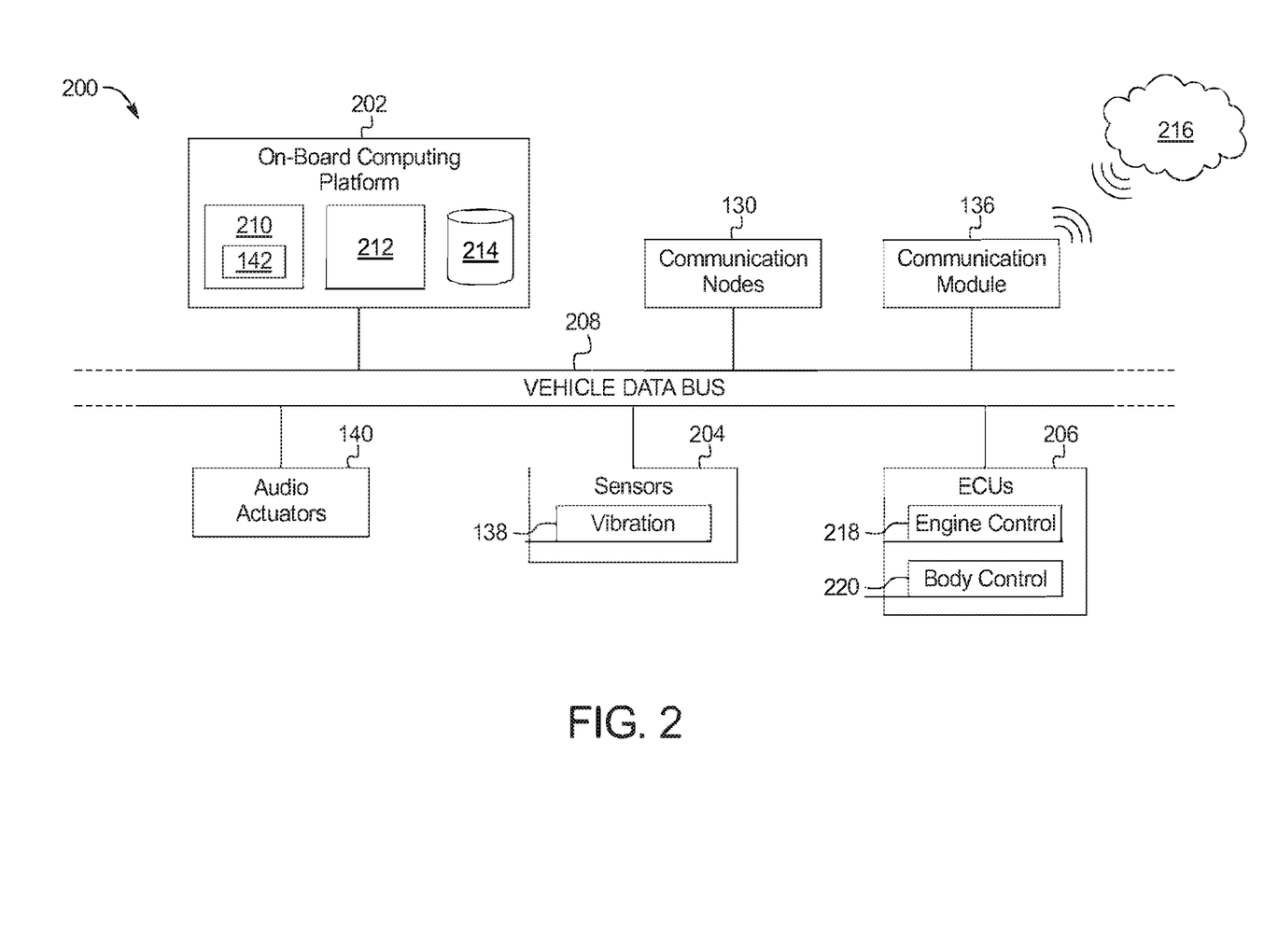
FIG. 2 is a block diagram of electronic components of the vehicle of FIG. 1.

Further, the vehicle 100 of the illustrated example includes a communication module 136 that includes wired or wireless network interfaces to enable communication with external networks (e.g., a network 216 of FIG. 2). The communication module 136 also includes hardware (e.g., processors, memory, storage, antenna, etc.) and software to control the wired or wireless network interfaces. In the illustrated example, the communication module 136 includes one or more communication controllers for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m); Near Field Communication (NFC); local area wireless network (including IEEE 802.11 a/b/g/n/ac or others), dedicated short range communication (DSRC), and Wireless Gigabit (IEEE 802.11ad), etc.). In some examples, the communication module 136 includes a wired or wireless interface (e.g., an auxiliary port, a Universal Serial Bus (USB) port, a Bluetooth® wireless node, etc.) to communicatively couple with a mobile device (e.g., a smart phone, a wearable, a smart watch, a tablet, etc.). In such examples, the vehicle 100 may communicated with the external network via the coupled mobile device. The external network(s) may be a public network, such as the Internet; a private network, such as an intranet; or combinations thereof, and may utilize a variety of networking protocols now available or later developed including, but not limited to, TCP/IP-based networking protocols.

The vehicle 100 also includes vibration sensors 138 that are coupled to the outer layer of the vehicle 100 to detect audio vibrations. For example, each of the vibration sensors 138 are rigidly mounted to interior surface(s) and/or exterior surface(s) of the outer layer of the vehicle 100. The vibration sensors 138 may be coupled to the interior surface(s) of the outer layer of the vehicle 100 to prevent the vibration sensors 138 from being contacted by other objects. In other examples, one or more of the vibration sensors 138 are embedded within the outer layer of the vehicle 100.

Further, in the illustrated example, each side of the vehicle 100 includes one of the vibration sensors 138. That is, one of the vibration sensors 138 is coupled to each of the front side 108, the rear side 110, the driver side 112, and the passenger side 114 of the vehicle 100. In other examples, more or less of the vibration sensors 138 may be coupled to one or more of the front side 108, the rear side 110, the driver side 112, and/or the passenger side 114 of the vehicle 100. Further, in the illustrated example, one of the vibration sensors 138 is coupled to each of the front windshield 116, the rear windshield 120, and the side windows 126. In other examples, more or less of the vibration sensors 138 may be coupled to one or more of the front windshield 116, the rear windshield 120, and/or one or more of the side windows 126. Further, in some examples, one or more of the vibration sensors 138 is coupled to the front panel 118, the rear panel 122, and/or one or more of the door panels 128.

The vibration sensors 138 of the illustrated example are configured to measure audio vibrations of portions of the outer layer of the vehicle 100 to which the vibration sensors 138 are coupled. The audio vibrations are caused by sound waves that are impinging upon the outer layer. For example, sound waves travelling through a medium (e.g., the front windshield 116, the front panel 118, the rear windshield 120, the rear panel 122, one or more of the side windows 126, one or more of the door panels 128) cause the medium to oscillate and/or vibrate. The vibration sensors 138 measure these audio vibrations caused by the sound waves when the sound waves impinge upon the corresponding portions of the outer layer of the vehicle 100 and generate electrical signals that correspond to the measured audio vibrations. The electrical signals may be subsequently processed and/or analyzed to determine the sound waves that impinged upon the outer layer of the vehicle 100. For example, the vibration sensors 138 are accelerometers (e.g., uni-axial accelerometers, tri-axial accelerometers, micro-machined accelerometers, piezoelectric accelerometers, etc.), piezoelectric contact films, microphones, and/or any other devices that are capable of detecting sound by monitoring audio vibrations of the outer layer. In the illustrated example, the vibration sensors 138 are configured to measure audio vibrations that are perpendicular to surface(s) to which the vibration sensors 138 are coupled. Further, the vibration sensors 138 also are configured to measure a wide frequency range of sound, for example, to enable detection of voice commands provided by the user 134.

In other words, the outer layer of the vehicle 100 and the vibration sensors 138 form microphones. For example, the portions of the outer layer that couple to the vibration sensors 138 function as diaphragms of the microphones. In the illustrated example, the front windshield 116 and one of the vibration sensors 138 that is coupled to the front windshield 116 form one microphone, the rear windshield 120 and one of the vibration sensors 138 that is coupled to the rear windshield 120 form another microphone, and the side windows 126 of those of the vibration sensors 138 that are coupled to the side windows 126 form other microphones. In other examples, the front panel 118 forms a microphone when one of the vibration sensors 138 is coupled to the front panel 118, the rear panel 122 forms a microphone when one of the vibration sensors 138 is coupled to the rear panel 122, and/or one or more of the door panels 128 forms a microphone with a corresponding one or more of the vibration sensors 138.

As illustrated in FIG. 1, the vehicle 100 also includes audio actuators 140 (also referred to as vibration speaker audio actuators) that are coupled to the outer layer of the vehicle 100 to vibrate the outer layer. For example, each of the audio actuators 140 (e.g., of SoundBug devices) are rigidly mounted to interior surface(s) and/or exterior surface(s) of the outer layer of the vehicle 100. The audio actuators 140 may be coupled to the interior surface(s) of the outer layer of the vehicle 100 to prevent the audio actuators 140 from being contacted by other objects. In other examples, one or more of the audio actuators 140 are embedded within the outer layer of the vehicle 100.

Further, in the illustrated example, each side of the vehicle 100 includes one of the audio actuators 140. That is, one of the audio actuators 140 is coupled to each of the front side 108, the rear side 110, the driver side 112, and the passenger side 114 of the vehicle 100. In other examples, more or less of the audio actuators 140 may be coupled to one or more of the front side 108, the rear side 110, the driver side 112, and/or the passenger side 114 of the vehicle 100. Further, in the illustrated example, one of the audio actuators 140 is coupled to each of the front windshield 116, the rear windshield 120, and the side windows 126. In other examples, more or less of the audio actuators 140 may be coupled to one or more of the front windshield 116, the rear windshield 120, and/or one or more of the side windows 126. Further, in some examples, one or more of the audio actuators 140 is coupled to the front panel 118, the rear panel 122, and/or one or more of the door panels 128.

The audio actuators 140 of the illustrated example are configured to emit sound by vibrating corresponding portions of the outer layer of the vehicle 100 to which the audio actuators 140 are coupled. For example, each of the audio actuators 140 includes an arm that actuates upon receiving an electrical signal. For each of the audio actuators 140, the arm contacts or causes another actuator component to contact an adjacent surface of the outer layer as the arm actuates to cause the outer layer to vibrate. That is, each of the audio actuators 140 functions as a tuning fork by actuating an adjacent portion of the outer layer to cause that portion of the outer layer to form an acoustic baffle of a speaker. In other words, the outer layer of the vehicle 100 and the audio actuators 140 form microphones. In the illustrated example, the front windshield 116 and one of the audio actuators 140 that is coupled to the front windshield 116 form one speaker, the rear windshield 120 and one of the audio actuators 140 that is coupled to the rear windshield 120 forms another speaker, and the side windows 126 of those of the audio actuators 140 that are coupled to the side windows 126 form other speakers. In other examples, the front panel 118 forms a speaker when one of the audio actuators 140 is coupled to the front panel 118, the rear panel 122 forms a speaker when one of the audio actuators 140 is coupled to the rear panel 122, and one or more of the door panels 128 form a speaker with a corresponding one or more of the audio actuators 140.

The vehicle 100 of the illustrated example also includes a voice-command controller 142. For example, the voice-command controller 142 is communicatively coupled (e.g., wired and/or wirelessly) to the communication nodes 130, the communication module 136, the vibration sensors 138, the audio actuators 140, and/or other electrical components of the vehicle 100. The voice-command controller 142 is configured to detect a voice command from the user 134 via one or more of the vibration sensors 138 and emit an audio response to the user 134 and/or perform a vehicle function for the user 134 based upon the voice command.

In operation, the voice-command controller 142 utilizes signals retrieved from the vibration sensors 138 to detect a voice command that has been provided by the user 134. For example, the voice-command controller 142 and the vibration sensors 138 are configured to detect voice command(s) that are provided by the user 134 when the user 134 is located outside of, but near, the cabin 106 of the vehicle 100. For example, to identify a voice command, the voice-command controller 142 initially receives an audio signal that is detected via one or more of the vibration sensors 138. The voice-command controller 142 subsequently utilizes voice recognition (e.g., via voice-recognition software) to identify a word or phrase within the audio signal and compares that word or phrase to a set of commands or requests (e.g., stored in a database 214 of FIG. 2) that correspond with the vehicle 100. If the identified word or phrase corresponds to one of the predefined commands or requests, the voice-command controller 142 detects a voice command within the audio signal detected via one or more of the vibration sensors 138.

In some examples, the vibration sensors 138 are triggered to detect a voice command of the user 134. For example, the voice-command controller 142 triggers the vibration sensors 138 to detect the voice command responsive to the voice-command controller 142 identifying, via one or more of the vibration sensors 138, that the user 134 has provided a wake-up term that precedes the voice command. That is, the user 134 is to provide the wake-up term prior to providing the voice command to trigger detection of the voice command. The wake-up-word can be any word or phrase preselected by the manufacturer or the driver, such as an uncommon word (e.g., "SYNC"), an uncommon name (e.g., "Clara"), and/or an uncommon phrase (e.g., "Hey SYNC," "Hey Clara"). For example, to identify the wake-up term, the voice-command controller 142 initially receives an audio signal that is detected via one or more of the vibration sensors 138. The voice-command controller 142 subsequently utilizes voice recognition (e.g., via voice-recognition software) to identify a word or phrase within the audio signal and compares that word or phrase to a predefined wake-up term (e.g., stored in the database 214) that corresponds with the vehicle 100. Upon identifying that the audio signal includes the predefined wake-up term, the voice-command controller 142 triggers the vibration sensors 138 to detect a voice command that follows the wake-up term.

Further, in some examples, the voice-command controller 142 activates the vibration sensors 138 for detecting the wake-up term responsive to detecting that the key fob 132 and/or a phone-as-a-key of the user 134 is within a communication range of the vehicle 100. For example, the voice-command controller 142 detects whether the key fob 132 that has been paired with is within the communication range of the vehicle 100 via one or more of the communication nodes 130 of the vehicle 100. In the illustrated example, the voice-command controller 142 is configured to detect a distance between the key fob 132 and the vehicle 100 based upon the received signal strength indicator(s) (RSSI) of signal(s) between the key fob 132 and one or more of the communication nodes 130. Upon detecting that the key fob 132 is within the communication range of the vehicle 100, the voice-command controller 142 activates the vibration sensors 138 to detect the wake-up term.

Additionally or alternatively, the voice-command controller 142 determines whether the detected wake-up term and/or voice command was provided by an authorized source. For example, the voice-command controller 142 confirms that the wake-up term and/or voice command was provided by the user 134 that is carrying the key fob 132 paired with the vehicle 100.

In some examples, the voice-command controller 142 utilizes voice recognition (e.g., via voice-recognition software). That is, the voice-command controller 142 compares vocal features and/or biometrics of the detected audio signal that includes the wake-up term and/or voice command to known vocal features and/or biometrics (e.g., stored in the database 214) of the user 134 to determine whether the user 134 that is authorized to utilize the vehicle 100 has provided the wake-up term and/or voice command.

Further, in some examples, the voice-command controller 142 determines whether the detected wake-up term and/or voice command was provided by an authorized source by comparing a location of the key fob 132 to a location of the source of the detected wake-up term and/or voice command. The voice-command controller 142 identifies the location of the key fob 132 via the communication nodes 130 based upon the RSSI of signals between the key fob 132 and a plurality of the communication nodes 130. For example, the voice-command controller 142 utilizes trilateration to determine the location of the key fob 132 based upon the RSSI of the signals. The voice-command controller 142 identifies a direction from which the wake-up term and/or voice command is provided by comparing signal strengths of the vibration sensors 138. For example, if the signal strength of the wake-up term and/or voice command detected by one of the vibration sensors 138 on the driver side 112 of the vehicle 100 is greater than that of one of the vibration sensors 138 on the passenger side 114, the voice-command controller 142 detects that the wake-up term and/or voice command from the driver side 112 of the vehicle 100. Similarly, if the signal strength of the wake-up term and/or voice command detected by one of the vibration sensors 138 on the front side 108 of the vehicle 100 is greater than that of one of the vibration sensors 138 on the rear side 110, the voice-command controller 142 detects that the wake-up term and/or voice command from the front side 110 of the vehicle 100. In response to determining that the location of the key fob 132 corresponds to the direction from which the wake-up term and/or voice command was provided, the determines that the detected wake-up term and/or voice command was provided by an authorized source.

Further, in some examples, the voice-command controller 142 determines which of the vibration sensors 138 to activate for detecting the wake-up term and/or voice command based upon the identified location of the key fob 132. For example, the voice-command controller 142 activates one or more of the vibration sensors 138 located toward the front side 108 upon detecting that the key fob 132 is located in front of the vehicle 100.

Upon detecting the voice command provided by the user 134, the voice-command controller 142 determines whether the voice command includes a request for information and/or an instruction to perform a vehicle function.

In response to the voice-command controller 142 determining that the voice command is a request for information, the voice-command controller 142 identifies an audio response based upon the request of information of the voice command. In some examples, the request for information includes a request of information that is included in a owner's manual of the vehicle 100, such as a factory-recommended tire pressure for the tires 102, and the audio response includes the information in the owner's manual, such as the factory-recommended tire pressure. Further, in some examples, the request for information includes a request for a vehicle sensor reading, such as a measured tire pressure of one or more of the tires 102, and the audio response includes the vehicle sensor reading, such as the measured tire pressure. In other examples, the request for information includes a request of information that is identified from an external network (e.g., a network 216 of FIG. 2), such as predicted weather conditions for the day, and the audio response includes the information retrieved from the external network, such as the predicted weather conditions.

Upon identifying the audio response, the voice-command controller 142 emits the audio response to the user 134 that is located outside of the cabin 106 of the vehicle 100 via one or more of the audio actuators 140 and/or any other vehicle speaker(s) configured to emit sound to an area outside of the cabin 106 of the vehicle 100. In some examples, the voice-command controller 142 determines which of the audio actuators 140 to utilize to emit the audio response based upon the identified location of the key fob 132. For example, the voice-command controller 142 utilizes one or more of the audio actuators 140 located toward the front side 108 of the vehicle to emit the audio response upon detecting that the key fob 132 and, thus, the user 134 is located in front of the vehicle 100.

In response to the voice-command controller 142 determining that the voice command is an instruction to perform a vehicle function, the voice-command controller 142 identifies the vehicle function to be performed and sends a signal to perform the identified vehicle function. In some examples, the vehicle function includes starting the engine 104, locking or unlocking one or more of the doors 124, opening or closing one or more of the side windows 126, sending a text message via the communication module 136, adding an item to a to-do or grocery list (e.g., stored in the database 214), sending a signal via the communication module 136 that requests for an off-site service to be performed, etc. Further, in some examples, the vehicle function includes initiating and facilitating a phone call in which one or more of the vibration sensors 138 receive audio of the phone call from the user 134 and one or more of the audio actuators 140 provide audio of the phone call to the user 134.

FIG. 2 is a block diagram of electronic components 200 of the vehicle 100. In the illustrated example, the electronic components 200 include an on-board computing platform 202, the communication nodes 130, the communication module 136, the audio actuators 140, sensors 204, electronic control units (ECUs) 206, and a vehicle data bus 208.

The on-board computing platform 202 includes a microcontroller unit, controller or processor 210; memory 212; and a database 214. In some examples, the processor 210 of the on-board computing platform 202 is structured to include the voice-command controller 142. For example, the voice-command controller 142 retrieves information stored in the database 214 to identify the audio response that is to be emitted to the user 134 via one or more of the audio actuators 140. Alternatively, in some examples, the voice-command controller 142 is incorporated into another electronic control unit (ECU) with its own processor 210, memory 212, and database 214.

The processor 210 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 212 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 212 includes multiple kinds of memory, particularly volatile memory and non-volatile memory.

The memory 212 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 212, the computer readable medium, and/or within the processor 210 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

Further, in the illustrated example, the communication module 136 of the vehicle 100 is wireless communication with a network 216. For example, the communication module 136 is communicatively coupled to the network 216 to enable the voice-command controller 142 to retrieve information from the network 216. The voice-command controller 142 utilizes the information retrieved from the network 216 to identify the audio response that is to be emitted to the user 134 via one or more of the audio actuators 140.

The sensors 204 are arranged in and around the vehicle 100 to monitor properties of the vehicle 100 and/or an environment in which the vehicle 100 is located. One or more of the sensors 204 may be mounted to measure properties around an exterior of the vehicle 100. Additionally or alternatively, one or more of the sensors 204 may be mounted inside a cabin of the vehicle 100 or in a body of the vehicle 100 (e.g., an engine compartment, wheel wells, etc.) to measure properties in an interior of the vehicle 100. For example, the sensors 204 include accelerometers, odometers, tachometers, pitch and yaw sensors, wheel speed sensors, microphones, tire pressure sensors, biometric sensors and/or sensors of any other suitable type. In the illustrated example, the sensors 204 include the vibration sensors 138 that detect voice command(s) provided by the user 134.

The ECUs 206 monitor and control the subsystems of the vehicle 100. For example, the ECUs 206 are discrete sets of electronics that include their own circuit(s) (e.g., integrated circuits, microprocessors, memory, storage, etc.) and firmware, sensors, actuators, and/or mounting hardware. The ECUs 206 communicate and exchange information via a vehicle data bus (e.g., the vehicle data bus 208). Additionally, the ECUs 206 may communicate properties (e.g., status of the ECUs 206, sensor readings, control state, error and diagnostic codes, etc.) to and/or receive requests from each other. For example, the vehicle 100 may have seventy or more of the ECUs 206 that are positioned in various locations around the vehicle 100 and are communicatively coupled by the vehicle data bus 208.

In the illustrated example, the ECUs 206 include an engine control unit 218 and a body control module 220. For example, the engine control unit 218 control(s) operation (e.g., remote starting) of the engine 104 of the vehicle 100. Further, the body control module 220 controls one or more subsystems throughout the vehicle 100, such as power windows, power locks, an immobilizer system, power mirrors, etc. For example, the body control module 220 includes circuits that drive one or more of relays (e.g., to control wiper fluid, etc.), brushed direct current (DC) motors (e.g., to control power seats, power locks, power windows, wipers, etc.), stepper motors, LEDs, etc.

The vehicle data bus 208 communicatively couples the communication nodes 130, the communication module 136, the audio actuators 140, the on-board computing platform 202, the sensors 204, and the ECUs 206. In some examples, the vehicle data bus 208 includes one or more data buses. The vehicle data bus 208 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 3:
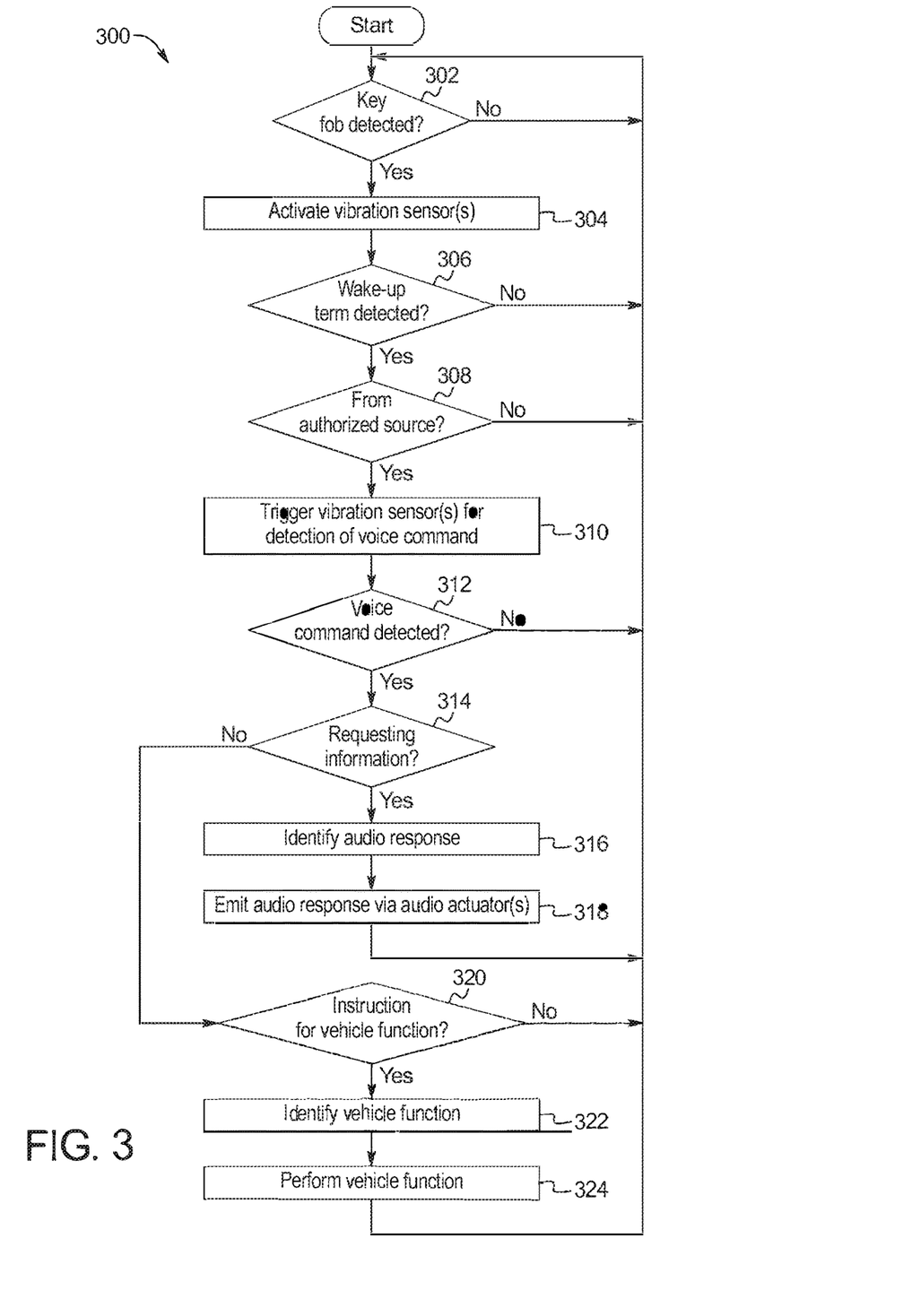
FIG. 3 is a flowchart for monitoring vehicle window vibrations to recognize voice commands in accordance with the teachings herein.

FIG. 3 is a flowchart of an example method 300 to monitor audio vibrations for recognizing voice commands. The flowchart of FIG. 3 is representative of machine readable instructions that are stored in memory (such as the memory 212 of FIG. 2) and include one or more programs which, when executed by a processor (such as the processor 210 of FIG. 2), cause the vehicle 100 to implement the example voice-command controller 142 of FIGS. 1 and 2. While the example program is described with reference to the flowchart illustrated in FIG. 3, many other methods of implementing the example voice-command controller 142 may alternatively be used. For example, the order of execution of the blocks may be rearranged, changed, eliminated, and/or combined to perform the method 300. Further, because the method 300 is disclosed in connection with the components of FIGS. 1-2, some functions of those components will not be described in detail below.

Initially, at block 302, the voice-command controller 142 detects whether the key fob 132 that corresponds to the vehicle 100 is within a communication range of the vehicle 100. For example, the voice-command controller 142 detects whether the key fob 132 is within the communication range of the vehicle 100 via one or more of the communication nodes 130 of the vehicle 100. The method 300 remains at block 302 in response to the voice-command controller 142 detecting that the key fob 132 is not within the communication range of the vehicle 100. Otherwise, in response to the voice-command controller 142 detecting that the key fob 132 is within the communication range of the vehicle 100, the method proceeds to block 304 at which the voice-command controller 142 activates one or more of the vibration sensors 138 for detection of a voice-command of the user 134.

At block 306, the voice-command controller 142 identifies whether a wake-up term (e.g., via speech recognition software of the vehicle 100) has been detected via one or more of the vibration sensors 138 of the vehicle 100. In response to the voice-command controller 142 not detecting the wake-up term, the method 300 returns to block 302 (e.g., to determine whether the key fob 132 has remained within the communication range of the vehicle 100). Otherwise, in response to the voice-command controller 142 detecting the wake-up term, the method 300 proceeds to block 308.

At block 308, the voice-command controller 142 determines whether the detected wake-up term was provided from an authorized source. For example, the voice-command controller 142 determines whether the detected wake-up term was provided by the user 134 of the vehicle 100 that corresponds to the key fob 132.

In some examples, the voice-command controller 142 determines whether the detected wake-up term was provided by an authorized source utilizing voice recognition (e.g., via voice-recognition software of the vehicle 100). That is, the voice-command controller 142 compares vocal features of the wake-up term detected by one or more of the vibration sensors 138 to known vocal features of the user 134 to determine whether the user 134 provided the wake-up term. In such examples, the voice-command controller 142 determines that the detected wake-up term was provided by an authorized source in response to identifying that the vocal features of the wake-up term matches the vocal features of the user 134.

Additionally or alternatively, the voice-command controller 142 determines whether the detected wake-up term was provided by an authorized source by comparing a location of the key fob 132 to a location of the source of the wake-up term. For example, the voice-command controller 142 identifies the location of the key fob 132 via the communication nodes 130 utilizing RSSI and trilateration. The voice-command controller 142 also identifies the location of the source of the wake-up term by comparing the strength of the signals detected by the vibration sensors 138. In such examples, the voice-command controller 142 determines that the detected wake-up term was provided by an authorized source in response to identifying that the location of the key fob 132 matches the location of the source of the wake-up term.

In response to the voice-command controller 142 determining that the detected wake-up term was not provided from an authorized source, the method 300 returns to block 302. Otherwise, in response to the voice-command controller 142 determining that the detected wake-up term was provided from an authorized source, the method 300 proceeds to block 310 at which the voice-command controller 142 triggers one or more of the vibration sensors 138 to detect a voice command provided by the authorized source (e.g., the user 134). For example, the voice-command controller 142 triggers the vibration sensors 138 to monitor for a voice command of the authorized source for a predetermined period of time after the wake-up term is detected.

At block 312, the voice-command controller 142 determines whether a voice command of the authorized source was detected by one or more of the vibration sensors 138 (e.g., within the predetermined monitoring window after the wake-up term was detected). In response to the voice-command controller 142 not detecting a voice command of the authorized source, the method 300 returns to block 302. Otherwise, in response to the voice-command controller 142 detecting a voice command of the authorized source, the method 300 proceeds to block 314.

At block 314, the voice-command controller 142 determines whether the voice command is a request for information. In response to the voice-command controller 142 determining that the voice command is a request for information, the method proceeds to block 316 at which the voice-command controller 142 identifies an audio response based upon the request of information of the voice command. At block 318, the voice-command controller 142 emits the audio response to the user 134 that is located outside of the cabin 106 of the vehicle 100 via one or more of the audio actuators 140 and/or any other vehicle speaker(s) configured to emit sound to an area outside of the cabin 106 of the vehicle 100. Otherwise, in response to the voice-command controller 142 determining at block 314 that the voice command is not a request for information, the method proceeds to block 320.

At block 320, the voice-command controller 142 determines whether the voice command is an instruction for the voice-command controller 142 to perform a vehicle function. In response to the voice-command controller 142 determining that the voice command is not an instruction to perform a vehicle function, the method 300 returns to block 302. Otherwise, in response to the voice-command controller 142 determining that the voice command is an instruction to perform a vehicle function, the method 300 proceeds to block 322 at which the voice-command controller 142 identifies the vehicle function to be performed (e.g., send a text message via the communication module 136, start the engine 104, open one or more of the side windows 126). At block 324, the voice-command controller 142 performs the identified vehicle function.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively. Additionally, as used herein, the terms "module," "node," and "unit" refer to hardware with circuitry to provide communication, control and/or monitoring capabilities, often in conjunction with sensors. A "module," a "node," and a "unit" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

We claim:

1. A vehicle comprising:
a window;
a vibration sensor coupled to the window to detect window vibrations caused by a sound wave from a user's voice travelling about the window, wherein the vibration sensor comprises an accelerometer, wherein the window and the accelerometer form a microphone;
a controller configured to:
receive, via the accelerometer, signals indicative of the window vibrations;
detect a voice command associated with the voice based on the signals; and
identify an audio response based upon the voice command.

2. The vehicle of claim 1, further comprising an audio actuator coupled to the window to vibrate the window.

3. The vehicle of claim 2, wherein the audio actuator actuates the window to cause the window to form an acoustic baffle.

4. The vehicle of claim 2, wherein the window to which the audio actuator is coupled includes a door panel.

5. The vehicle of claim 2, further comprising a plurality of vibration sensors and a plurality of audio actuators located on a front side, a rear side, a driver side, and a passenger side of the vehicle.

6. The vehicle of claim 1, wherein the window is a windshield.

7. The vehicle of claim 1, wherein the controller detects the voice command of and emits the audio response for the user when the user is outside of a vehicle cabin.

8. The vehicle of claim 1, wherein the controller is configured to trigger detection of the voice command responsive to detecting a wake-up term via the vibration sensor, the wake-up term preceding the voice command.

9. The vehicle of claim 1, wherein the voice command includes a request to identify a factory-recommended tire pressure and the audio response includes the factory-recommended tire pressure.

10. The vehicle of claim 1, wherein the voice command includes an instruction for the controller to perform a vehicle function.

11. The vehicle of claim 10, wherein the instruction is selected from at least one of sending a text message via a communication module, starting an engine, and/or opening a vehicle window.

12. A method comprising:
detecting, via a vibration sensor comprising an accelerometer, a voice command of a user, the vibration sensor coupled to a window of a vehicle to detect window vibrations caused by a sound wave from the user's voice travelling about the window, wherein the window and the accelerometer form a microphone, wherein detecting the voice command comprises:
receiving, via the accelerometer, signals indicative of the window vibrations; and
detecting the voice command associated with the voice based on the signals; and
identifying, via a processor, an audio response based upon the voice command.

13. The method of claim 12, further comprising triggering detection of the voice command responsive to detecting a wake-up term via the vibration sensor, the wake-up term preceding the voice command.

* * * * *